US009398456B2

(12) United States Patent  
Jadhav et al.

(10) Patent No.: US 9,398,456 B2
(45) Date of Patent: Jul. 19, 2016

(54) ELECTRONIC DEVICE WITH ACCESSORY-BASED TRANSMIT POWER CONTROL

(71) Applicant: Apple Inc., Cupertino, CA (US)

(72) Inventors: Digvijay A. Jadhav, Sunnyvale, CA (US); Indranil S. Sen, Santa Clara, CA (US); Jonathan C. King, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 14/201,620

(22) Filed: Mar. 7, 2014

(65) Prior Publication Data

US 2015/0257158 A1 Sep. 10, 2015

(51) Int. Cl.
*H04M 1/00* (2006.01)
*H04W 12/06* (2009.01)
*H04B 1/04* (2006.01)
(Continued)

(52) U.S. Cl.
CPC .............. *H04W 12/06* (2013.01); *H04B 1/04* (2013.01); *H04B 1/3877* (2013.01); *H04B 1/40* (2013.01); *H04M 1/72527* (2013.01); *H04W 4/22* (2013.01); *H04W 52/04* (2013.01); *H04W 52/146* (2013.01); *H04W 52/281* (2013.01); *H04W 52/283* (2013.01); *H04B 2001/0416* (2013.01); *H04M 1/72536* (2013.01);
(Continued)

(58) Field of Classification Search
CPC ..................... H04M 1/72519; H04M 1/72522; H04W 52/24; H04W 76/007
USPC ......................... 455/550.1, 522, 556.1, 404.1
See application file for complete search history.

(56) References Cited

U.S. PATENT DOCUMENTS 5,337,353 A 8/1994 Boie et al.
5,451,965 A 9/1995 Matsumoto
(Continued)

FOREIGN PATENT DOCUMENTS

CN 1343380 4/2002
CN 1696743 11/2005
(Continued)

OTHER PUBLICATIONS

Schlub et al., U.S. Appl. No. 13/865,578, filed Apr. 18, 2013.
(Continued)

*Primary Examiner* — Danh Le
(74) *Attorney, Agent, or Firm* — Treyz Law Group, P.C.; G. Victor Treyz; Michael H. Lyons (57) ABSTRACT

An electronic device may be provided with wireless circuitry for transmitting and receiving wireless signals. Control circuitry may be used to adjust transmit power levels for the wireless signals and other settings for the wireless circuitry. The electronic device may be operated in conjunction with an external accessory. The accessory may be equipment that includes a dock connector, a case to enclose the electronic device, equipment that is coupled to the electronic device using a cable, or other external electronic equipment. An identifier may be stored in the accessory. The impact of the accessory on the wireless performance of the electronic device may be characterized and associated with the identifier. During operation of the electronic device, the electronic device may adjust transmit power levels and other settings based on the identifier of the accessory and based on sensor data, user input, and other information.

20 Claims, 8 Drawing Sheets (51) Int. Cl.
*H04B 1/40* (2015.01)
*H04B 1/3877* (2015.01)
*H04W 4/22* (2009.01)
*H04W 52/04* (2009.01)
*H04W 52/14* (2009.01)
*H04W 52/28* (2009.01)
*H04M 1/725* (2006.01)
*H04W 52/24* (2009.01)

(52) U.S. Cl.
CPC ......... *H04M2250/12* (2013.01); *H04W 52/247* (2013.01); *H04W 52/248* (2013.01)

(56) References Cited

U.S. PATENT DOCUMENTS

| | | | |
|---|---|---|---|
| 5,463,406 A | 10/1995 | Vannatta et al. | |
| 5,650,597 A | 7/1997 | Redmayne | |
| 5,748,054 A | 5/1998 | Tonegawa et al. | |
| 5,777,693 A | 7/1998 | Kishigami et al. | |
| 5,805,067 A | 9/1998 | Bradley et al. | |
| 5,826,458 A | 10/1998 | Little | |
| 5,854,972 A | 12/1998 | Pennock et al. | |
| 5,864,316 A | 1/1999 | Bradley et al. | |
| 5,905,467 A | 5/1999 | Narayanaswamy et al. | |
| 5,956,626 A | 9/1999 | Kaschke et al. | |
| 6,242,982 B1 | 6/2001 | Ibelings et al. | |
| 6,275,684 B1 | 8/2001 | Kaneko et al. | |
| 6,285,893 B1 | 9/2001 | Keirinbou | |
| 6,329,958 B1 | 12/2001 | McLean et al. | |
| 6,380,899 B1 | 4/2002 | Madsen et al. | |
| 6,408,187 B1 | 6/2002 | Merriam | |
| 6,408,193 B1 | 6/2002 | Katagishi et al. | |
| 6,456,856 B1 | 9/2002 | Werling et al. | |
| 6,483,463 B2 | 11/2002 | Kadambi et al. | |
| 6,529,088 B2 | 3/2003 | Lafleur et al. | |
| 6,590,539 B2 | 7/2003 | Shinichi | |
| 6,611,227 B1 | 8/2003 | Nebiyeloul-Kifle et al. | |
| 6,657,595 B1 | 12/2003 | Phillips et al. | |
| 6,678,532 B1 | 1/2004 | Mizoguchi | |
| 6,757,267 B1 | 6/2004 | Evans et al. | |
| 6,761,316 B2 | 7/2004 | Bridgelall et al. | |
| 6,806,835 B2 | 10/2004 | Iwai et al. | |
| 6,862,433 B2 | 3/2005 | Callaway | |
| 6,879,293 B2 | 4/2005 | Sato | |
| 6,959,209 B2 | 10/2005 | Fang | |
| 6,978,121 B1 | 12/2005 | Lane et al. | |
| 6,985,113 B2 | 1/2006 | Nishimura et al. | |
| 7,016,686 B2 | 3/2006 | Spaling | |
| 7,039,435 B2 | 5/2006 | McDowell et al. | |
| 7,050,010 B2 | 5/2006 | Wang et al. | |
| 7,053,629 B2 | 5/2006 | Nevermann | |
| 7,109,945 B2 | 9/2006 | Mori | |
| 7,113,087 B1 | 9/2006 | Casebolt | |
| 7,116,959 B1 | 10/2006 | Link et al. | |
| 7,146,139 B2 | 12/2006 | Nevermann | |
| 7,149,483 B1 | 12/2006 | Reinisch et al. | |
| 7,181,251 B2 | 2/2007 | Stohr et al. | |
| 7,187,332 B2 | 3/2007 | Kezys et al. | |
| 7,499,722 B2 | 3/2009 | McDowell et al. | |
| 7,522,846 B1 | 4/2009 | Lewis et al. | |
| 7,557,760 B2 | 7/2009 | Chang et al. | |
| 7,633,076 B2 | 12/2009 | Huppi et al. | |
| 7,826,875 B2 | 11/2010 | Karaoguz | |
| 7,834,813 B2 | 11/2010 | Caimi et al. | |
| 7,916,089 B2 | 3/2011 | Schlub et al. | |
| 7,999,748 B2 | 8/2011 | Ligtenberg et al. | |
| 8,159,399 B2 | 4/2012 | Dorsey | |
| 8,238,971 B2 | 8/2012 | Terlizzi | |
| 8,255,009 B2 | 8/2012 | Sorensen et al. | |
| 8,326,221 B2 | 12/2012 | Dorsey | |
| 8,326,385 B2 | 12/2012 | Brogle | |
| 8,347,014 B2 | 1/2013 | Schubert et al. | |
| 8,417,296 B2 | 4/2013 | Caballero et al. | |
| 8,577,289 B2 | 11/2013 | Schlub et al. | |
| 8,749,523 B2 | 6/2014 | Pance et al. | |
| 8,781,420 B2 | 7/2014 | Schlub et al. | |
| 8,818,450 B2 | 8/2014 | Caballero et al. | |
| 9,071,336 B2 | 6/2015 | Schlub et al. | |
| 9,179,299 B2 | 11/2015 | Schlub et al. | |
| 2002/0027474 A1 | 3/2002 | Bonds | |
| 2002/0060645 A1 | 5/2002 | Shinichi | |
| 2002/0094789 A1 | 7/2002 | Harano | |
| 2002/0123309 A1 | 9/2002 | Collier et al. | |
| 2003/0062907 A1 | 4/2003 | Nevermann | |
| 2003/0064732 A1 | 4/2003 | McDowell et al. | |
| 2003/0064761 A1 | 4/2003 | Nevermann | |
| 2003/0186728 A1 | 10/2003 | Manjo | |
| 2003/0197597 A1 | 10/2003 | Bahl et al. | |
| 2003/0210203 A1 | 11/2003 | Phillips et al. | |
| 2003/0218993 A1 | 11/2003 | Moon et al. | |
| 2004/0176083 A1 | 9/2004 | Shiao et al. | |
| 2004/0189542 A1 | 9/2004 | Mori | |
| 2004/0222926 A1 | 11/2004 | Kontogeorgakis et al. | |
| 2005/0124305 A1 | 6/2005 | Stichelbout | |
| 2005/0157646 A1 | 7/2005 | Addagatla et al. | |
| 2005/0245204 A1 | 11/2005 | Vance | |
| 2006/0050007 A1 | 3/2006 | Min | |
| 2006/0161871 A1 | 7/2006 | Hotelling et al. | |
| 2006/0205368 A1 | 9/2006 | Bustamante et al. | |
| 2006/0232468 A1 | 10/2006 | Parker et al. | |
| 2006/0244663 A1 | 11/2006 | Fleck et al. | |
| 2007/0188375 A1 | 8/2007 | Richards et al. | |
| 2008/0114252 A1* | 5/2008 | Randall et al. ............... 600/447 |
| 2008/0165063 A1 | 7/2008 | Schlub et al. | |
| 2008/0220831 A1 | 9/2008 | Alameh et al. | |
| 2008/0248837 A1 | 10/2008 | Kunkel | |
| 2008/0309836 A1 | 12/2008 | Sakama et al. | |
| 2008/0316120 A1 | 12/2008 | Hirota et al. | |
| 2009/0000023 A1 | 1/2009 | Wegelin et al. | |
| 2009/0096683 A1 | 4/2009 | Rosenblatt et al. | |
| 2009/0174611 A1 | 7/2009 | Schlub et al. | |
| 2009/0295648 A1 | 12/2009 | Dorsey et al. | |
| 2010/0062728 A1 | 3/2010 | Black et al. | |
| 2010/0167672 A1 | 7/2010 | Ahn et al. | |
| 2011/0012793 A1 | 1/2011 | Amm et al. | |
| 2011/0012794 A1 | 1/2011 | Schlub et al. | |
| 2011/0043227 A1 | 2/2011 | Pance et al. | |
| 2011/0045789 A1 | 2/2011 | Sinton et al. | |
| 2011/0212746 A1 | 9/2011 | Sarkar et al. | |
| 2011/0250928 A1* | 10/2011 | Schlub ............... H01Q 1/243 455/550.1 |
| 2011/0310005 A1* | 12/2011 | Chen et al. ............... 345/156 |
| 2012/0296596 A1* | 11/2012 | Profitt ............... G06F 3/0346 702/104 |
| 2013/0159559 A1* | 6/2013 | Hess ............... G06F 13/385 710/14 |
| 2013/0225117 A1* | 8/2013 | Giacoletto ............... H04W 4/22 455/404.2 |
| 2013/0231161 A1* | 9/2013 | Hsu et al. ............... 455/566 |
| 2015/0234427 A1* | 8/2015 | Schmidt ............... G06F 1/1632 361/679.43 |

FOREIGN PATENT DOCUMENTS

| | | |
|---|---|---|
| CN | 1747228 | 6/2006 |
| CN | 101053170 | 10/2007 |
| CN | 101330162 | 12/2008 |
| DE | 102005035935 | 2/2007 |
| EP | 0 564 164 | 10/1993 |
| EP | 1298809 | 4/2003 |
| EP | 1 469 550 | 10/2004 |
| EP | 1 524 774 | 4/2005 |
| EP | 1564896 | 8/2005 |
| GB | 2 380 359 | 4/2003 |
| JP | 2003179670 | 6/2003 |
| JP | 2003209483 | 7/2003 |
| JP | 2003216318 | 7/2003 |
| JP | 200667061 | 3/2006 |
| JP | 2006218083 | 8/2006 |
| JP | 2008009759 | 1/2008 |
| JP | 2008011292 | 1/2008 |

(56) References Cited

FOREIGN PATENT DOCUMENTS

| | | |
|---|---|---|
| JP | 2008537615 | 9/2008 |
| JP | 2009032570 | 2/2009 |
| WO | 0131733 | 5/2001 |
| WO | 02/05443 | 1/2002 |
| WO | 2005112280 | 11/2005 |
| WO | 2007116790 | 10/2007 |
| WO | 2008/078142 | 7/2008 |
| WO | 2009022387 | 2/2009 |
| WO | 2009149023 | 12/2009 |
| WO | 2013165419 | 11/2013 |

OTHER PUBLICATIONS

Myllmaki et al., "Capacitive recognition of the user's hand grip position in mobile handsets", Progress in Electromagnetics Research B, vol. 22, 2010, pp. 203-220.

Breeden, "Audible Message Alert With Ear Proximity Detector for Portable Handsets," Motorola, Inc. Technical Developments, vol. 12, Apr. (p. 102-103).

"CapTouch Programmable Controller for Single-Electrode Capacitance Sensors", AD7147 Data Sheet Rev. B, [online], Analog Devices, Inc., [retrieved on Dec. 7, 2009], <URL: http://www.analog.com/static/imported-files/data_sheets/AD7147.pdf>.

\* cited by examiner

| STATUS | TRANSMIT POWER LEVEL |
|---|---|
| PROXIMITY SENSOR READING IS HIGH | P1 |
| PROXIMITY SENSOR READING IS MEDIUM | P2 |
| PROXIMITY SENSOR READING IS LOW | P3 |
| DEVICE IS COUPLED TO ACCESSORY TYPE A | P3 |
| DEVICE IS COUPLED TO ACCESSORY TYPE B | P4 |
| EMERGENCY MODE | P5 |

ELECTRONIC DEVICE WITH ACCESSORY-BASED TRANSMIT POWER CONTROL

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to achieve desired wireless communications performance targets in electronic devices, particularly when a device is portable and compact. As a device is moved to different locations in a wireless network, it may be necessary to increase and decrease the amount of power that is transmitted during wireless communications to satisfy network requirements. Regulatory bodies may also impose constraints on how much power can be transmitted by a device. At the same time, users are seeking optimum wireless performance. These constraints may conflict, but such conflicts may be difficult to resolve satisfactorily.

It would therefore be desirable to be able to provide improved ways for controlling wireless performance in an electronic device such as the amount of power transmitted by the electronic device during wireless communications.

SUMMARY

An electronic device may be provided with wireless circuitry. The electronic device may be a portable electronic device such as a cellular telephone or tablet computer, or may be other electronic equipment.

The wireless circuitry in the electronic device may include radio-frequency transceiver circuitry and one or more antennas for transmitting and receiving wireless signals. The radio-frequency transceiver circuitry may include a transceiver and a power amplifier that can be controlled in real time to adjust wireless signal transmit power levels. During operation, control circuitry may be used to adjust transmit power levels for the wireless signals and other settings for the wireless circuitry.

The electronic device may be operated in conjunction with an external accessory. The external accessory may be equipment that includes a dock connector, a case to enclose the electronic device, equipment that is coupled to the electronic device using a cable, or other external electronic equipment. An identifier may be stored in the external accessory. An accessory can be identified by the electronic device using the identifier that is stored in the accessory.

The impact of the external accessory on the wireless performance of the electronic device may be characterized and associated with the identifier. Some external accessories may influence the amount of emitted wireless power in the vicinity of the electronic device. For example, a case or an accessory with a dock may reduce emitted radiation hotspots. By taking into account the hotspot-reducing influence of attached accessories, an electronic device may be able to optimize transmitted power settings to enhance wireless performance.

If desired, user input from an authorized user, sensor data, commands from a wireless base station, and other data may be used in addition to the identifier to determine how to adjust wireless transmit power levels. Additional actions may also be taken in response to detection of a particular type of accessory identifier or other input. For example, antennas can be selected for use, antennas may be tuned, or other wireless settings may be adjusted by the electronic device.

DETAILED DESCRIPTION

Figure 1:
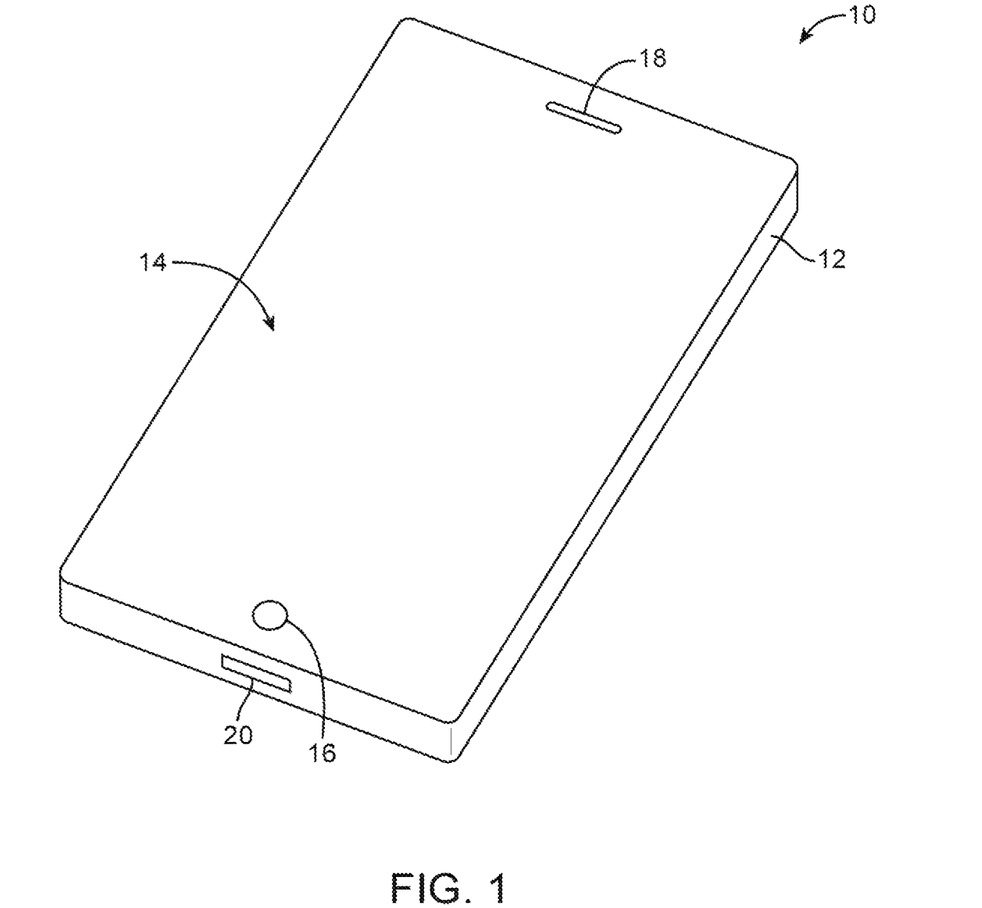
FIG. 1 is a perspective view of an illustrative electronic device with wireless communications circuitry in accordance with an embodiment.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHz Bluetooth® band and the 2.4 GHz and 5 GHz WiFi® wireless local area network bands (sometimes referred to as IEEE 802.11 bands or wireless local area network communications bands). Device 10 may also contain wireless communications circuitry for implementing near-field communications, communications at 60 GHz, light-based wireless communications, satellite navigation system communications, or other wireless communications.

An electronic device such as electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings such as opening 20 may be formed in housing 12 to form communications ports (e.g., an audio jack port, a digital data port, etc.).

Figure 2:
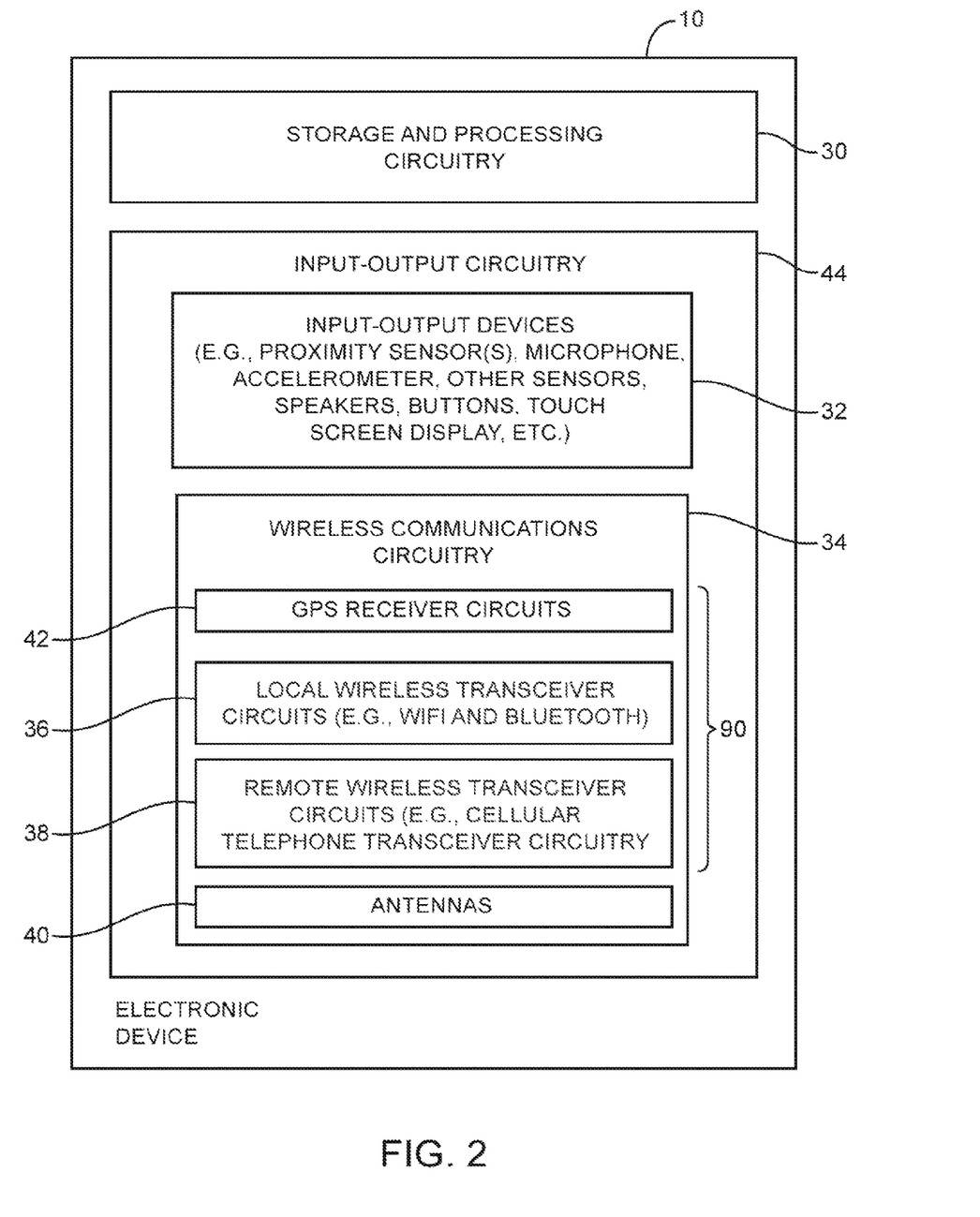
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors (e.g., a capacitive proximity sensor and/or an infrared proximity sensor), magnetic sensors, connector port sensors that determine whether a connector such as an audio jack and/or digital data connector have been inserted in a connector port in device 10, a connector port sensor or other sensor that determines whether device 10 is mounted in a dock, other sensors for determining whether device 10 is coupled to an accessory, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include satellite navigation system circuitry such as global positioning system (GPS) receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna.

Transmission line paths may be used to couple antenna structures 40 to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. One or more of the antennas may be blocked by a user's body or other external object while one or more other antennas are not blocked. If desired, control circuitry 30 may be used to select an optimum antenna to use in device 10 in real time. Control circuitry 30 may, for example, make an antenna selection based on information on received signal strength, based on sensor data (e.g., information from a proximity sensor indicating which of multiple antennas may be blocked by an external object), or based on other information.

With one suitable arrangement, device 10 obtains information on which external accessories are coupled to device 10. For example, device 10 may determine whether device 10 has been mounted in a dock in an accessory, whether an accessory such as a headset or other device with a cable has been plugged into a port on device 10, or whether device 10 is otherwise being used in conjunction with an accessory. In situations such as these, it may be desirable to take actions with device 10 that are based on the current operating environment for device 10. As an example, device 10 may select an antenna to use based on which accessory or type of accessory is being used with device 10, device 10 may adjust transmit power levels based on which accessory or type of accessory is being used with device 10, or may take other actions based on which accessory or type of accessory is being used with device 10.

Figure 3:
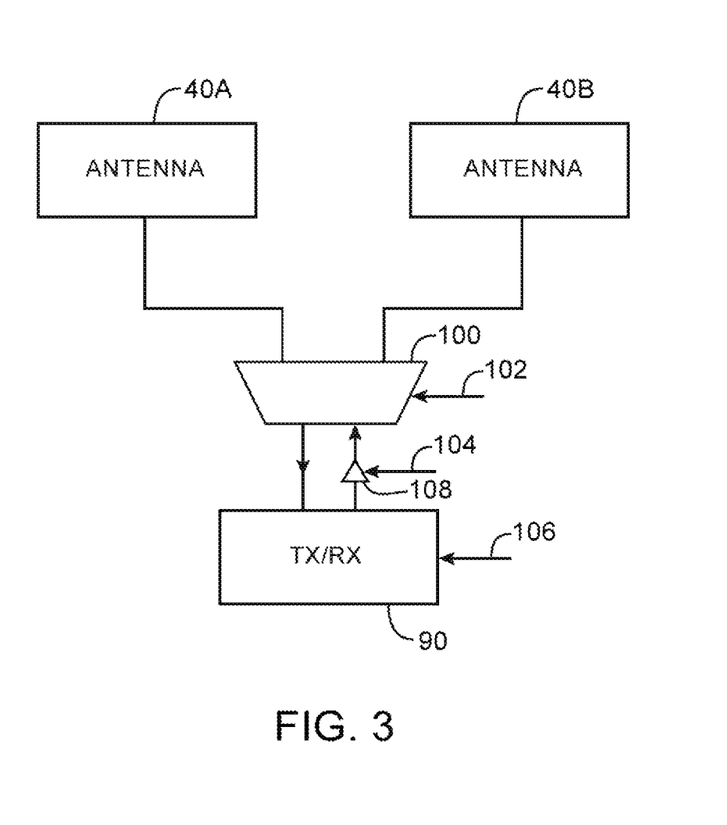
FIG. 3 is a diagram of illustrative circuitry for selecting between multiple antennas in accordance with an embodiment.

FIG. 3 is a schematic diagram of a portion of an illustrative device that includes multiple antennas. As shown in the example of FIG. 3, switching circuitry such as multiplexer 100 may be used to couple antennas 40A and 40B to radio-frequency transceiver circuitry 90. Control lines such as control lines 102, 104, and 106 may receive control signals from control circuitry 30. In response to information on which accessory or type of accessory is being used with device 10 or other information (e.g., information from a proximity sensor, transmit power commands from a network base stations, etc.), control circuitry 30 can issue control commands on paths such as paths 102, 104, and 106. For example, a control command issued on path 102 may be used to switch either antenna 40A or antenna 40B into use by transceiver 90 (i.e., to transmit and/or receive wireless antenna signals). Control paths may also be used to control the wireless transceiver circuitry of device 10 such as transceiver 90 and power amplifier 108. In particular, a control command on path 106 may be used to adjust the output power for transmitted antenna signals produced by transceiver 90 and/or a control command on power amplifier control path 104 may be used to adjust the output power for amplified transmitted antenna signals at the output of power amplifier 108. In general, the wireless transmit power level for device 10 may be adjusted by adjusting the output power from transceiver 90 and/or from power amplifier circuitry such as power amplifier 108.

Figure 4:
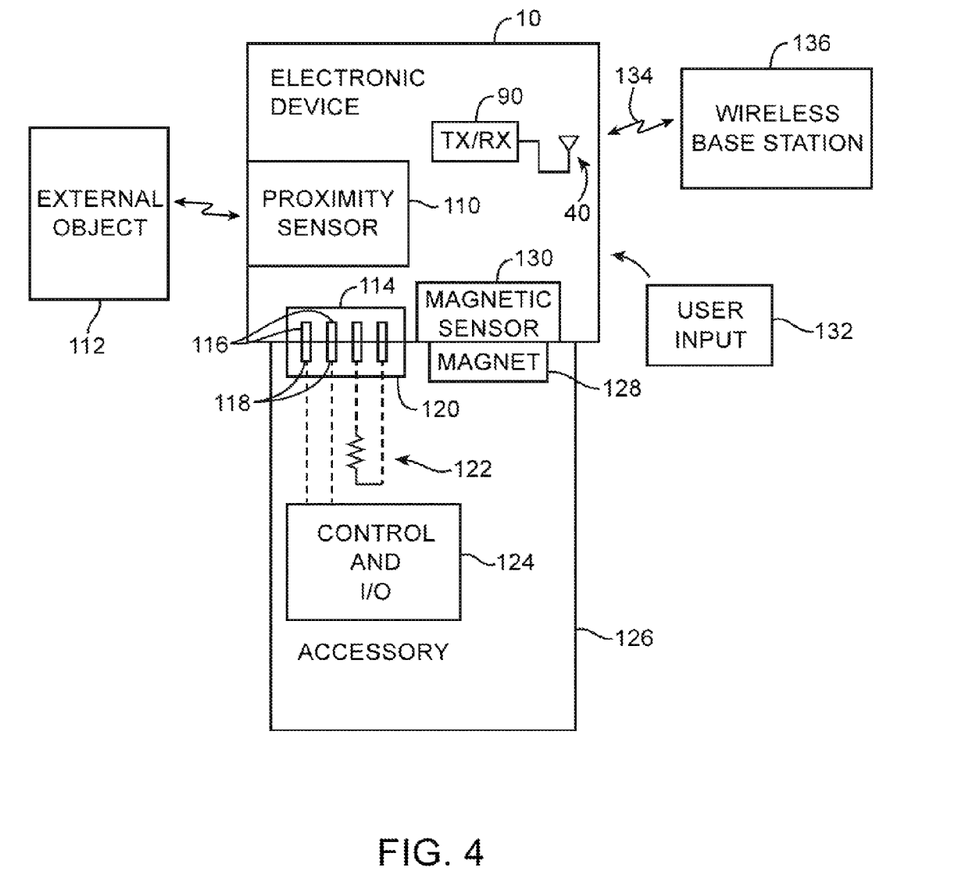
FIG. 4 is a diagram of an illustrative operating environment for a wireless electronic device that can communicate with a wireless base station and that can be coupled to an accessory device in accordance with an embodiment.

FIG. 4 is a circuit diagram of device 10 and external equipment that may be used with device 10 such as accessory 126 and wireless base station 136. Device 10 may use radio-frequency transceiver circuitry 90 and antenna(s) 40 to communicate with wireless base station 136. During operation, device 10 may use transceiver circuitry 90 and antenna(s) 40 to transmit wireless signals 134 to base station 136 and may use transceiver circuitry 90 and antenna(s) 40 to receive wireless signals 134. Base station 136 may be a cellular telephone base station, a wireless local area network base station, or other external wireless equipment that supports wireless communications with device 10.

Device 10 may include sensors such as proximity sensor 110. Proximity sensor 110 may be a light-based proximity sensor, a capacitive proximity sensor, and/or a proximity sensor based on other technologies. An illustrative light-based proximity sensor may include a light emitter such as an infrared light-emitting diode and may have a light sensor such as a photodetector. A capacitive proximity sensor may have capacitor electrode structures that measure changes in capacitance due to the presence of external objects. Using proximity sensor 110, device 10 can monitor for the presence of external objects such as object 112 in the vicinity of device 10. For example, device 10 can use readings from proximity sensor 110 to determine when an external object such as a user's body or other object are within a given distance of device 10 and/or may obtain other proximity sensor data.

Electronic device 10 may operate in conjunction with one or more external electronic devices such as accessory 126. Accessory 126 may include some or all of the components in electronic device 10 of FIG. 2. Examples of accessories that may be used with device 10 include a headset with an audio cable or digital cable that mates with device 10, a speaker with an audio cable or digital cable that mates with device 10, a clock radio with a dock that receives device 10, a powered speaker that contains a dock that receives device 10, a head unit, audio system, navigation system, or other electrical equipment in a vehicle that has a dock or cable that receives device 10, a keyboard that mates with device 10, a cover (e.g., a leather or plastic case) that receives device 10 and that may optionally have a keyboard or other component that mates with device 10, or other external equipment.

Accessory 126 may have one or more connectors such as connector 120. Connector 120 may be an audio jack connector (e.g., a tip-ring-sleeve connector, a tip-ring-ring-sleeve connector or other audio jack connector having a ⅛" diameter or a ¼" diameter or other suitable diameter), may be a digital data connector (e.g., a data connector with one or more digital data lines and one or more power lines such as a Universal Serial Bus connector or other connector having a differential digital data line pair and a pair of positive and ground power lines), may be a connector that supports a combination of analog and data signals on shared lines and/or on dedicated analog lines and dedicated digital lines, or may be any other suitable type of connector. Connector 120 may be mounted within a connector port in a housing for accessory 126, may be attached to the end of a cable that is plugged into accessory 126 or that serves as a pigtail for accessory 126, or may otherwise be coupled to accessory 126.

Device 10 may have a connector such as connector 114 that mates with connector 120 of accessory 126. Connectors such as connectors 114 and 120 may have contacts (sometimes referred to as pins). For example, connector 114 may have contacts 116 and connector 120 may have contacts 118. There may be any suitable number of contacts in the connectors of device 10 and accessory 126. For example, connector 114 may have four contacts 116 and connector 120 may have four mating contacts 120. Configurations for connectors 114 and 120 that have fewer than four contacts or more than four contacts may also be used. The configuration of FIG. 4 in which connector 114 has four contacts 116 and connector 120 has four contacts 118 is merely illustrative.

During operation of device 10, wireless base station 136 may send commands to device 10 that instruct device 10 to raise or lower the transmit power level associated with wireless signals 134 that are being transmitted by radio-frequency transceiver circuitry 90 and antenna(s) 40. If transmit powers are too low, link quality between device 10 and wireless base station 136 will be low. If, however, transmit powers are too high, device 10 may cause wireless interference that prevents other devices in the network from communicating effectively with wireless base station 136. The commands issued by wireless base station 136 to device 10 (and other devices in the network) raise and lower transmit power to balance these concerns. The commands to raise and lower transit power levels are sometimes referred to as TPC commands or transmit power commands.

Device 10 may use input-output circuitry 44 to gather user input 132 from a user of device 10. For example, a user may press one or more buttons in device 10, may provide voice commands to device 10, may enter information into a touch screen (e.g., by pressing on-screen buttons or otherwise selecting on-screen options on display 14), or may otherwise supply input to device 10. User input 132 may be used in controlling the software running on device 10, which, in turn, controls the operation of device 10.

Device 10 may take actions that depend on the identity of accessory 126. For example, wireless circuit adjustments and other adjustments may be made based on which type of accessory is coupled to device 10. Accessory 126 may contain control circuitry and input-output circuitry 124. An integrated circuit in circuitry 124 or other circuitry 124 (e.g., registers, a memory circuit, etc.) may be used to store an accessory identifier (ID). The identifier may uniquely identify accessory 126 and/or may identify accessory 126 as being part of a larger class (or classes) of device. As an example, the identifier information stored in circuitry 124 may specify that accessory 126 is a headset or a particular class of headset, may specify that accessory 126 is a dock or is a dock in a particular type of environment such as an in-vehicle dock, may specify that accessory 126 is a case or is a particular type of case (e.g., a case with a hinge, a case without a hinge, a case with a particular thickness or a particular set of radio-frequency characteristics, etc.), or may specify that accessory 126 has other characteristics.

If desired, the identifier may be stored in accessory 126 using one or more resistors such as resistor 122 (e.g., resistors that are shorted between contacts 118 in connector 120). When device 10 and accessory 126 are coupled by attaching connectors 114 and 120 together, control circuitry 30 in device 10 can evaluate the resistance values of the one or more resistors 122 in accessory 126 to determine that identifier. Magnets such as magnet 128 may also be used to store identifiers in accessories 126 (e.g., in accessories such as a case that can receive device 10, etc.). The properties of the magnet(s) may be monitored by device 10 using magnetic sensors in device 10 such as magnetic sensor 130. Information may be encoded based on magnet strength, magnetic polarity, magnet location within the case or other accessory, etc.

Regardless of how device 10 obtains identifier information from accessory 126, the identifier that is obtained may be used to specify characteristics about accessory 126 that are used in adjusting the operation of device 10 (e.g., wireless operation, etc.). As an example, the accessory identifier may be correlated with radio-frequency properties such as the propensity of accessory 126 to attenuate wireless signal powers in the vicinity of antenna 40. This relationship between accessory identifier and the wireless behavior of device 10 when device 10 is coupled to accessory 126 allows device 10 to control radio-frequency transmit powers for the wireless antenna signals 134 that are being transmitted by radio-frequency transceiver 90 and antenna(s) 40 based on the identity of accessory 126.

To ensure that regulatory limits are met for wireless emissions in the vicinity of a user's body, device 10 may impose a wireless transmit power limit on transmitted wireless signals 134. The transmit power limit may vary as a function of wireless frequency (or communications band) or as a function of other wireless communications parameters (e.g., communications protocol, etc.). Abiding by the transmit power limit specified by regulatory bodies ensures that device 10 will be operated safely.

In some situations, such as when device 10 is being held in a user's hand, pressed against a user's head, or rested on a user's lap, it may be desirable to reduce the transmit power for device 10 to ensure that regulatory limits for emitted radiation are satisfied. Proximity sensor data from proximity sensor 110 can determine when a user's body or other external object is present in the vicinity of device 10, so that the transmit power can be reduced accordingly.

When device 10 is being used with certain accessories, it may be desirable to increase the transmit power to ensure that device 10 can communicate satisfactorily with wireless base stations 136 or other external wireless equipment. Consider, as an example, a scenario in which device 10 is mounted on a dock associated with accessory 126 (i.e., a dock having a dock connector such as connector 120). Because the dock is bulky and is associated with equipment such as a clock radio, powered set of speakers, or in-vehicle equipment, device 10 will be located far from the body of the user. The presence of the accessory therefore allows radio-frequency signals that are transmitted to decrease in intensity before potentially reaching a user. In this type of situation, it is safe to raise the wireless transmit power limit for device 10 and it is desirable to do so to improve the quality of wireless communications with external equipment such as wireless base station 136. Signals from proximity sensor 110 may indicate that an external object is close to device 10 when device 10 is mounted in an accessory (e.g., a case or a device with a dock), but because the external object is part of an inanimate object such as the dock and is not part of a user's body, it is appropriate to raise the transmit power limit. The power-reduction response of device 10 that would otherwise be made in the presence of detecting an external object in the vicinity of sensor 110 may be suppressed.

Different types of accessories may have different radio-frequency characteristics. For example, in some accessories, such as certain accessories with docks, device 10 may be well isolated from contact with a user's body. In other accessories, such as cases that enclose device 10, device 10 may be well isolated from contact with a user's body, but may not be as isolated as when device 10 is mounted to an accessory dock. The identifier in accessory 126 (in this example) can specify whether the accessory is equipment with a dock (e.g., in-vehicle equipment) or is a case. When device 10 senses that accessory 126 is an accessory of the type that has a dock, device 10 can set the maximum transmit power level to a first level. In response to sensing that accessory 126 is a case, device 10 can establish a transmit power limit at a second level that is lower than the first level. Each accessory can be characterized in advance of use with device 10 and an appropriate identifier may be stored in that accessory based on the ability of the accessory to reduce hotspots in transmitted signal powers and otherwise attenuate the power of wireless signals reaching a user.

In addition to controlling radio-frequency transmit powers for signals 134 based on the identity of accessory 126, device 10 may control radio-frequency transmit powers for signals 134 based on user input 132, based on data from proximity sensor 110, based on commands from wireless base station 136, and/or based on data from other sensors and circuitry in device 10. Device 10 may also take other actions based on these inputs. For example, device 10 may take actions such as switching a desired antenna into use from a set of multiple antennas, may tune one or more antennas in device 10, or may take other actions based on the identity of accessory 126, based on user input 132, based on data from proximity sensor 110, based on commands from wireless base station 136, and/or based on data from other sensors and circuitry in device 10.

There is generally an interplay between the data received from proximity sensor 110 and other sensors, an accessory identifier, commands received from base stations 136 (e.g., transmit power commands), and data from user input 132. Device 10 (e.g., control circuitry 30) may implement a hierarchy that resolves conflicts between data from different sources. As an example, if device 10 receives a TPC command from base station 136 that instructs device 10 to raise the transmit power level being used to transmit wireless signals, that command will be followed unless a proximity sensor signal from proximity sensor 110 indicates that there is an external object in the vicinity of device 10. The presence of the external object adjacent to device 10 indicates that device 10 may be currently in use by a user who is resting device 10 on the user's leg, is holding device 10, or is otherwise close to device 10. In this illustrative example, the data form the proximity sensor is placed higher in the control hierarchy than the data from the wireless base station. To ensure that device 10 does not transmit signals that are too weak, even when it would be appropriate to raise output powers, information from the identifier in accessory 126 and/or user input 132 may be placed higher in the control hierarchy than data from the proximity sensor.

As an example, if the identifier in accessory 126 indicates that device 10 is currently mounted in a dock in an automobile while the proximity sensor in device 10 is detecting a nearby object, device 10 can conclude that the proximity sensor in device 10 is sensing the presence of the dock rather than a human body. As a result, device 10 may allow the transmit power for wireless antenna signals in device 10 to be raised above the reduced level that would otherwise be set by the proximity sensor reading. The transmit power may also, if desired, be raised above the normal transmit power limit that would be imposed for device 10, because (in this example), it is known that device 10 (i.e., the antenna in device 10 that is transmitting the wireless signals) is well separated from the user's body.

As another example, a user may enter a special "emergency responder" code into device 10 or other authorization that certifies that the user is an authorized emergency responder (personnel associated with a police force, fire department, ambulance service, etc.) or is otherwise involved in an emergency situation in which temporarily elevated wireless transmit powers are appropriate. When device 10 receives the emergency responder code, device 10 may temporarily raise the transmit power limit to ensure that a satisfactory wireless communications link is maintained between device 10 and wireless base station 136.

Figure 5:
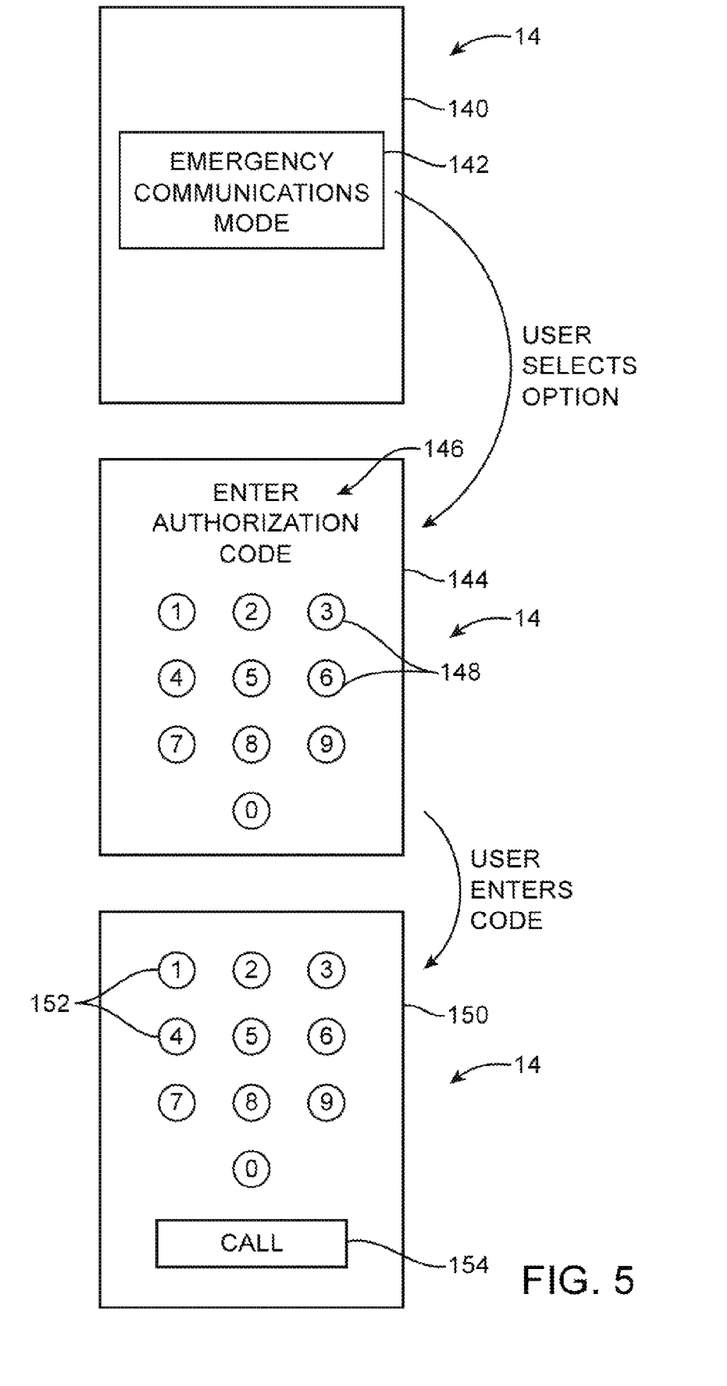
FIG. 5 is a diagram of illustrative display screens that may be displayed for a user in accordance with an embodiment.

FIG. 5 shows illustrative display screens that may be displayed for a user as the user provides device 10 with user input 132 such as an emergency authorization code. Initially, display 14 of device 10 may display a screen for the user such as screen 140. Screen 140 may contain one or more on-screen options such as option 142. Option 142 may be selected by the user when the user believes that an emergency situation makes it appropriate to temporarily raise the wireless transmit power limit for device 10. In response to selection of on-screen option 142, device 10 may display screen 144 on display 14. Screen 144 may contain instructions such as instructions 146 that direct the user to enter an authorization code using on-screen options such as on-screen buttons 148. In response to receiving an authorized code from the user via buttons 148, device 10 may display a screen such as screen 150 for the user. Screen 150 may allow the user to make a cellular telephone call by typing a desired telephone number into keypad keys such as keys 152 and by pressing call option 154. Other on-screen options may be used to allow the user to communicate using device 10 if desired (e.g., text messaging options, email options, video call options, voice communications options other than traditional cellular telephone voice calls, etc.). When making the telephone call or supporting other wireless communications, device 10 may temporarily raise the wireless transmit power limit that is being used by device 10.

Figure 6:
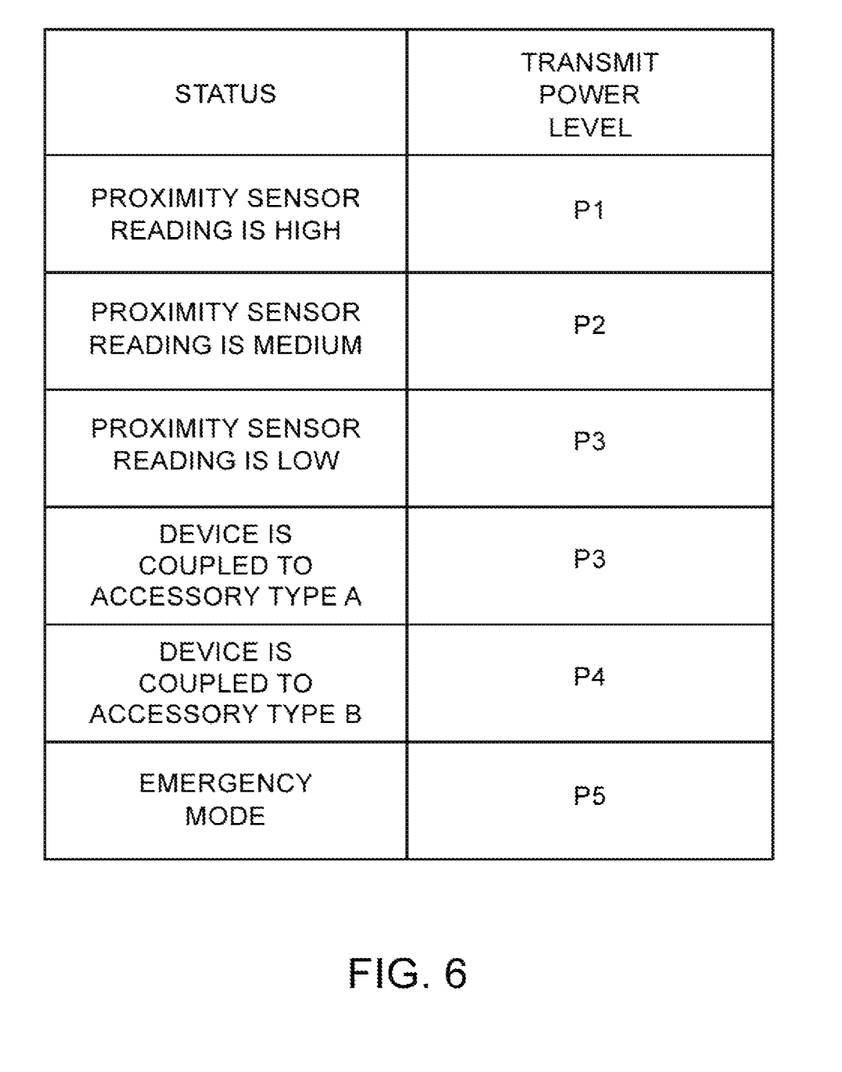
FIG. 6 is a table showing how wireless transmit powers may be set to different levels as a function of device status in accordance with an embodiment.

FIG. 6 is a table showing how the maximum allowed transmit power level in device 10 may be adjusted as a function of different operating conditions in device 10. In the example of FIG. 6, if a proximity sensor reading from proximity sensor 110 is high (indicating that external object 112 is close to device 10), the corresponding transmit power level may be set to a relatively low value of P1. If, the proximity sensor reading is lower (i.e., a medium value), the transmit power level may be raised to a slightly higher value of P2 (i.e., a value above P1). When proximity sensor readings are weak, external object 112 is relatively far from device 10, so the transmit power may be set to a level of P3 that is greater than P2. When device 10 is installed in an accessory of type A (e.g., a case), antenna(s) 40 are shielded from direct contact with a user by virtue of the presence of the case. As a result, less radiated power can be absorbed into the user's body and the maximum wireless transmit power for device 10 may be raised to a level P4 that is greater than P3.

In response to detection that device 10 has been installed in an accessory of type B (e.g., in a dock in an in-vehicle device), the maximum wireless transmit power can be raised to an even higher level of P5, due to the large separation between antenna 40 in device 10 and the user. In emergency mode (e.g., when an emergency responder or other user enters a value emergency authorization code) or other user input 132, device 10 can set the transmit power to a level of P5 that is greater than level P4 or an even higher level (as examples).

During operation, transmit power commands from base station 136 can be received and processed and may be used to further adjust the current output power for device 10. For example, if the current transmit power for device 10 is P3, TPC commands may temporarily lower the transmit power to P2 if deemed necessary to prevent interference in the network. As another example, if the maximum transmit power has been set to level P5 to handle an emergency situation, power-lowering TPC commands may be temporarily ignored. Other types of transmit power control scenarios may be implemented in device 10, if desired. The arrangement of FIG. 6 is merely illustrative and is presented as an example of how different types of sensor data, user input, and wireless base station command data can be used in controlling wireless transmit power levels in device 10.

Figure 7:
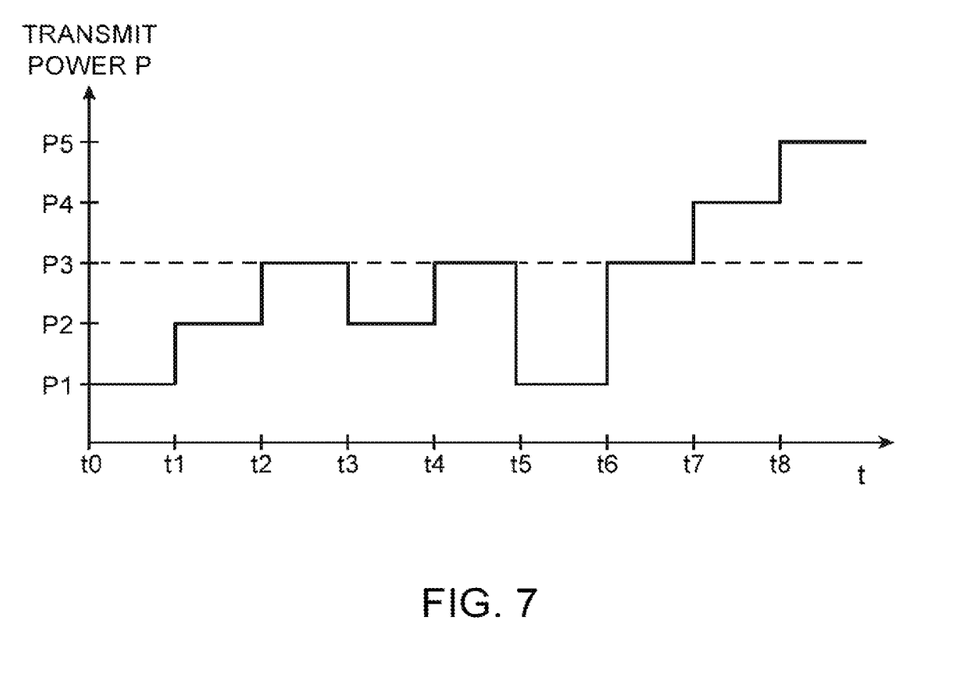
FIG. 7 is a graph showing how wireless transmit power may be adjusted over time as device status changes during operation in accordance with an embodiment.

FIG. 7 is a graph showing an illustrative scenario in which wireless transmit power P for device 10 is changed as a function of time due to changes in received TPC commands, proximity sensor data, other data on the operating conditions of device 10, a detected accessory identifier, and/or user input. At times between t0 and t1, device 10 is close to base station 136, so device 10 is able to sustain a high quality wireless communications link between device 10 and base station 136 while using relatively low transmit powers. Base station 136 senses that device 10 is able to back off transmit power to level P1 without unduly compromising link quality and therefore issues TPC commands that reduce transmit power to level P1. Between times t1 and t2, device 10 moves farther from base station 136, so base station 136 directs device 10 to increase its transmit power to level P2. Between times t2 and t3, device 10 has been moved to a location that is remote from base station 136, so base station 136 issues a TPC command that directs device 10 to increase wireless transmit power P to a relatively high level of P3. Level P3 in this example, is the largest normally permitted transmit power for device 10 that complies with regulatory limits on emitted radiation (assuming device 10 is not installed within a case, dock, or other equipment that increases the separation between the user and the antennas in device 10).

Even though, at time t3, the maximum transmit power of P3 has been requested by base station 136, data from proximity sensor 110 may be used to override the transmit power level set by base station 136. This is illustrated by the reduced transmit power level of P2 that is used between times t3 and t4. In this example, base station 136 directed device 10 to use transmit power P3, but proximity sensor 110 detected an external object at time t3 that was located at a sufficiently close distance to dictate that the wireless transmit power for device 10 should be reduced to transmit power level P2. At times between t4 and t5, the external object is once again located farther from device 10 and the transmit power is accordingly allowed to rise to P3 again. If desired, operating mode information (i.e., information that device 10 is using an ear speaker and is therefore being held against the side of a user's head) may be used to adjust wireless transmit power (see, e.g., illustrative transmit power level P1 between times t5 and t6). Reduced power level P1 between times t5 and t6 may also result from detection of the user's body using a light-based proximity sensor or other sensor (e.g., an accelerometer that detects motion, a sound sensor that detects absorption of ultrasonic tones emitted by a speaker in device 10 by clothing on a user, temperature sensor that indicates that the user is holding device 10, etc.).

In the FIG. 7 example, device 10 returns to normal maximum transmit power P3 at times between t6 and t7 (i.e., TPC commands from base station 136 have requested that device 10 transmit signals with its normal maximum allowed power and no nearby object is present). In this mode of operation, device 10 is fairly remote from base station 136 and must therefore increase transmit power as much as possible to sustain satisfactory communications. At times between time t7 and t8, device 10 has been coupled to accessory 126. Device 10 detects the identifier stored in accessory 126 by reading the identifier information through the connector in device 10 that is coupled to accessory 126 and/or using magnetic sensing or other identifier detection techniques. Accessory 126 partly shields the user from radiated emissions, so it is appropriate for device to further increase the transmit power level P to power P4 in response to detection of the identifier. The type of identifier that is received can be used by device 10 to determine how much transmit power P can be increased. The ability to transmit signals at a power P4 that is larger than the normal maximum of P3 helps enhance wireless communications link quality while still satisfying regulatory limits on emitted radiation levels in the vicinity of device 10.

At times greater than t8 in the FIG. 7 example, an emergency situation has made it necessary for the user to override the normal internal transmit power controls in device 10. The user may, as an example, supply device 10 with an emergency responder's code or other authorization. When device 10 is instructed by the user input that an emergency situation is present, device 10 temporarily increases transmit power P to an elevated level of P5 (in this example). The use of this elevated transmit power ensures that the user can communicate with base station 136, even if the base station is sufficiently remote from device 10 that communications at lower powers such as transmit power P3 would be unsuccessful.

Figure 8:
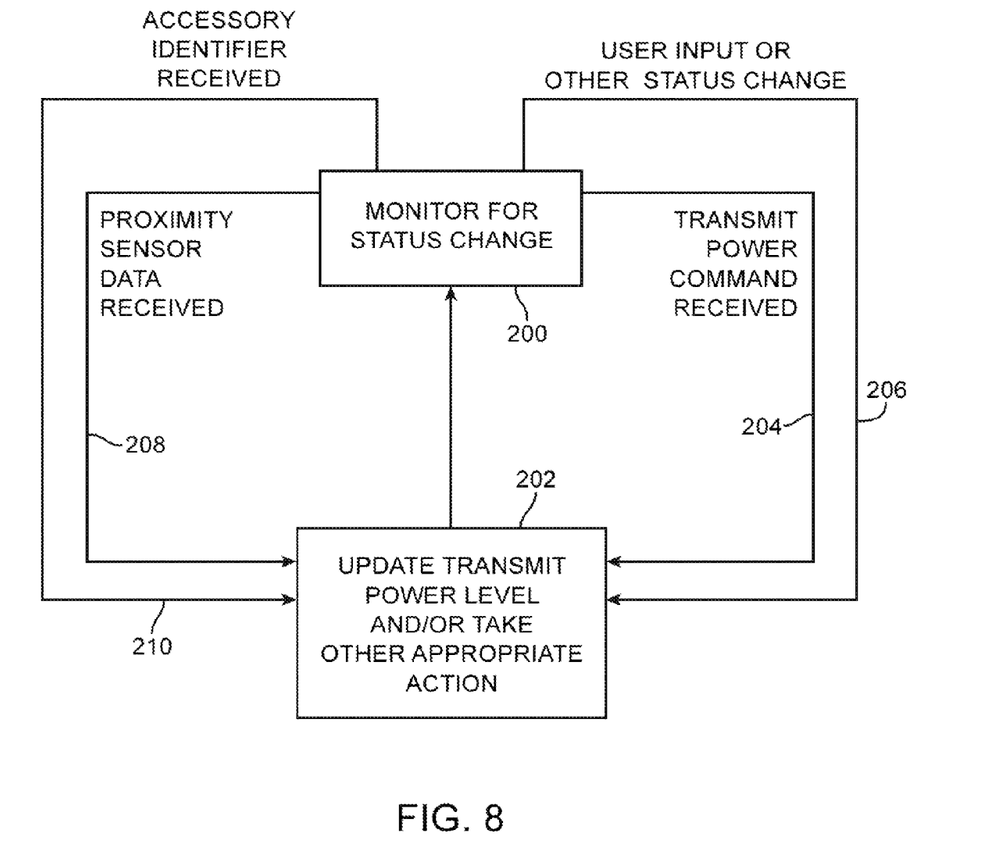
FIG. 8 is a flow chart of illustrative operations involved in controlling wireless transmit power during use of an electronic device in accordance with an embodiment.

A flow chart of illustrative steps involved in operating device 10 in a scenario in which multiple different types of data are used in determining how to control the wireless transmit power and other wireless behavior of device 10 are shown in FIG. 8. At step 200, device 10 may perform monitoring operations to determine whether or not operating conditions dictate a change in wireless transmit power. Device 10 also uses wireless transceiver circuitry 90 and antenna(s) 40 to transmits signals with the currently active transmit power setting P during the operations of step 200. Base station 136 receives and processes the transmitted signals and transmits signals to device 10 that are received by device 10, thereby maintaining a wireless link between device 10 and base station 136.

During the monitoring operations of step 200, device 10 uses control circuitry 30 to determine whether a transmit power command has been received from base station 136 (see, e.g., line 204), to determine whether proximity sensor data from proximity sensor 110 has been received that indicates that an external object is close to device 10 (see, e.g., line 208), to determine whether an accessory identifier has been received making it appropriate to raise transmit power limits or take other actions (see, e.g., line 210), and to determine whether user input 132 or other data (e.g., data from other sensors or circuitry in device 10) has been received (see, e.g., line 206). Using an established data hierarchy, device 10 determines an appropriate transmit power level P to use for device 10. The wireless transmit power P may then be updated at step 202 before operations return to step 200, where wireless signals are transmitted using the currently effective transmit power.

If desired, additional actions and/or alternative actions may be taken at step 202 based on the results of the monitoring operations of step 200. In particular, device 10 may switch a desired antenna into use based on the data collected during the monitoring operations of step 200, may tune one or more antenna(s) 40 based on the data collected during the monitoring operations of step 200, or may take other appropriate actions. If, as an example, device 10 determines that an accessory such as a dock has been coupled to device 10, device 10 may tune its antenna(s) to compensate for antenna detuning resulting from the presence of the dock. As another example, if device 10 determines that an emergency situation is present, device 10 may switch one or more particular antenna(s) into use to enhance transmit power capabilities for device 10 or to otherwise optimize operation. Sensor data such as temperature data, accelerometer data, audio data, and other data may also be used in making these adjustments to the operation of device 10, if desired.

The foregoing is merely illustrative and various modifications can be made by those skilled in the art without departing from the scope and spirit of the described embodiments. The foregoing embodiments may be implemented individually or in any combination.

What is claimed is:

1. An electronic device configured to couple to an external accessory, comprising:
   an antenna;
   wireless radio-frequency transceiver circuitry that transmits wireless signals at a wireless transmit power level using the antenna; and
   control circuitry that receives an identifier from the accessory and that controls the wireless radio-frequency transceiver circuitry to adjust the wireless transmit power level based on the identifier and based on transmit power commands received from a wireless base station.

2. The electronic device defined in claim 1 further comprising a proximity sensor, wherein the control circuitry is configured to control the wireless radio-frequency transceiver circuitry to adjust the wireless transmit power level based on data from the proximity sensor.

3. The electronic device defined in claim 2, wherein the control circuitry is configured to control the wireless radio-frequency transceiver circuitry to adjust the wireless transmit power level to one of first, second, and third different transmit power levels based on the data from the proximity sensor and to one of fourth and fifth different transmit power levels based on the identifier, wherein the third and fourth transmit power levels are greater than the first, second, and third transmit power levels.

4. The electronic device defined in claim 1 further comprising input-output circuitry that receives user input from a user, wherein the control circuitry is configured to control the wireless radio-frequency transceiver circuitry to adjust the wireless transmit power level based on the user input.

5. The electronic device defined in claim 4 wherein the user input comprises an emergency authorization and wherein the input-output circuitry comprises circuitry that receives the emergency authorization.

6. The electronic device defined in claim 4 wherein the input-output circuitry comprises a touch screen display and wherein the user input comprises an authorization received through the touch screen display.

7. The electronic device defined in claim 1 wherein the accessory has a dock, the electronic device further comprising:
   a connector that is coupled to the dock.

8. The electronic device defined in claim 1 wherein the accessory is a case, the electronic device further comprising a magnetic sensor that senses the identifier by detecting magnetic signals from the case with the magnetic sensor.

9. The electronic device defined in claim 1 further comprising a sensor, wherein the control circuitry is configured to adjust the wireless transmit power based on data from the sensor.

10. The electronic device defined in claim 9 wherein the sensor comprises an accelerometer.

11. The electronic device defined in claim 9 wherein the sensor comprises a capacitive proximity sensor.

12. The electronic device defined in claim 9 wherein the sensor comprises a light-based proximity sensor.

13. The electronic device defined in claim 9 wherein the sensor comprises an audio sensor.

14. The electronic device defined in claim 1 further comprising a housing with a connector port, wherein the accessory is coupled to the connector port.

15. The electronic device defined in claim 1 further comprising:
   an additional antenna; and
   switching circuitry that selectively couples the antenna and the additional antenna to the wireless radio-frequency transceiver circuitry, wherein the control circuitry is configured to couple a selected one of the antenna and the additional antenna to the wireless transceiver circuitry based on the identifier.

16. The electronic device defined in claim 1 wherein the antenna comprises a tunable antenna and wherein the control circuitry is configured to tune the antenna based on the identifier.

17. The electronic device defined in claim 1, wherein the transmitted wireless signals comprise wireless data that is transmitted at the wireless power level to external communications equipment that is separate from the external accessory.

18. The electronic device defined in claim 1, wherein the control circuitry is configured to control the wireless radio-frequency transceiver circuitry to reduce the wireless transmit power level based on the received identifier.

19. A portable electronic device configured to be coupled to an external accessory in which an accessory identifier for that accessory is stored, comprising:
   a housing;
   a display mounted in the housing;
   a proximity sensor mounted in the housing that monitors for external objects adjacent to the housing;
   an antenna;
   wireless radio-frequency transceiver circuitry that transmits wireless signals at a wireless transmit power level using the antenna;
   input-output circuitry;
   a connector; and
   control circuitry that receives user input from a user with the input-output circuitry and that receives the accessory identifier with the connector, wherein the control circuitry controls the wireless radio-frequency transceiver circuitry to adjust the wireless transmit power level based on the user input, the accessory identifier, and transmit power commands received from a wireless base station.

20. The portable electronic device defined in claim 19 wherein the accessory comprises in-vehicle equipment and wherein the user input comprises an emergency responder authorization.

* * * * *